United States Patent [19]

Laghi

[11] 4,402,657

[45] Sep. 6, 1983

[54] SHUTTLE PLATE IMPROVEMENT FOR A MOLD FOR A LIQUID INJECTION MOLDING APPARATUS

[75] Inventor: Aldo A. Laghi, Saratoga, N.Y.

[73] Assignee: General Electric Company, Waterford, N.Y.

[21] Appl. No.: 272,424

[22] Filed: Jun. 10, 1981

[51] Int. Cl.³ .............................................. B29F 1/14
[52] U.S. Cl. ................................... 425/183; 425/185; 425/186; 425/190; 425/543; 425/548; 425/556; 425/588
[58] Field of Search ............... 425/183, 185, 186, 190, 425/556, 588, 543, 548; 264/297, 328.8

[56] References Cited

U.S. PATENT DOCUMENTS 2,332,856 10/1943 Kalajian ...................... 264/328.8 X

FOREIGN PATENT DOCUMENTS 2062432 7/1971 Fed. Rep. of Germany ...... 425/DIG. 51

*Primary Examiner*—Thomas P. Pavelko

[57] ABSTRACT

A mold apparatus which in addition to the other mold elements, has shuttle plate means adjacent to the nozzle means out of which the molding composition comes out of into the mold cavity, which shuttle plate means forms part of the mold cavity. The shuttle plate means are adapted to automatically take a finished molded part from the mold and remove it out of the mold apparatus. At the same time while the molded part is being taken out of one portion of the shuttle plate means, the other part of the shuttle plate means is being utilized to form a molded part.

18 Claims, 8 Drawing Figures

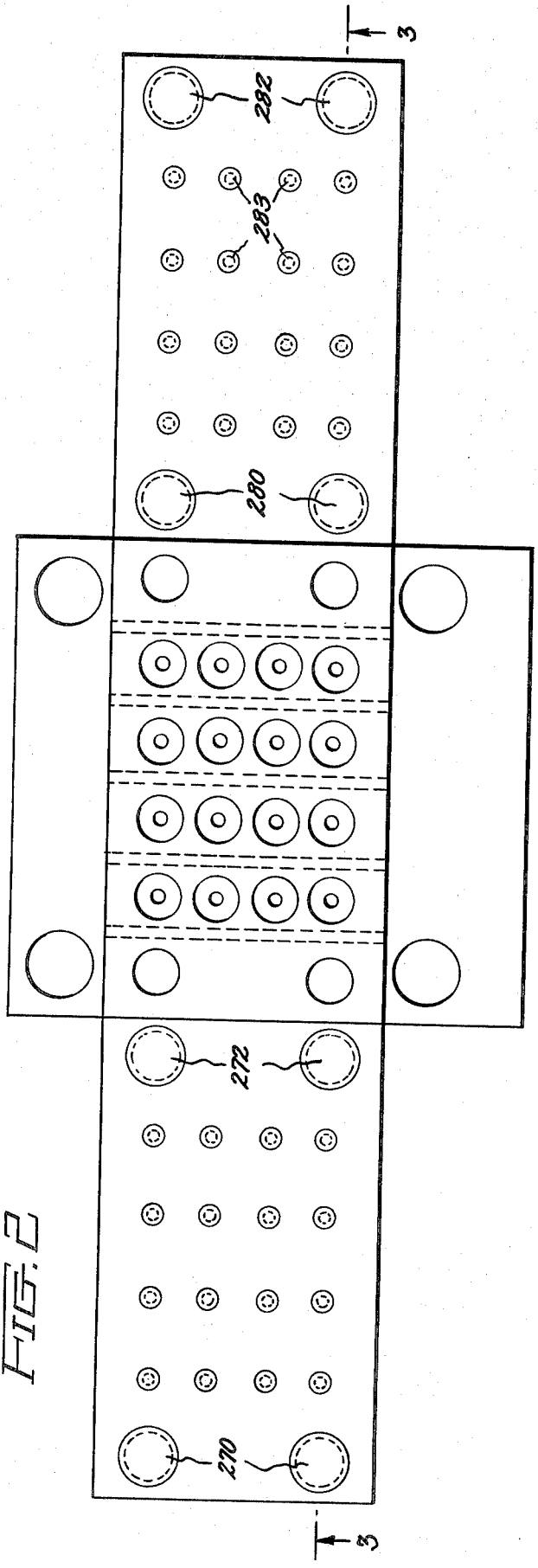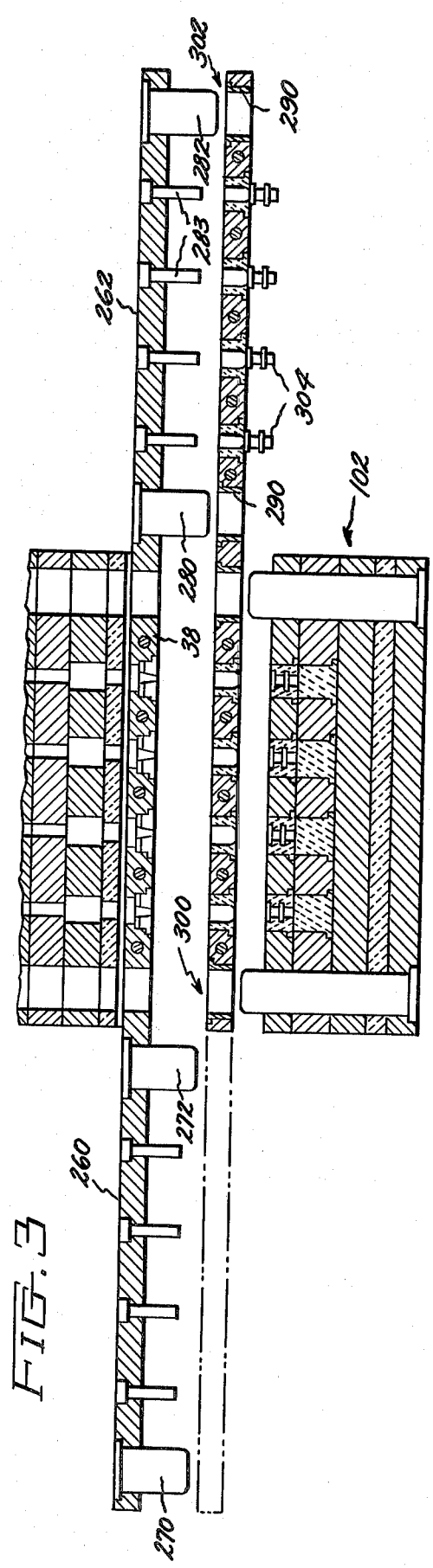

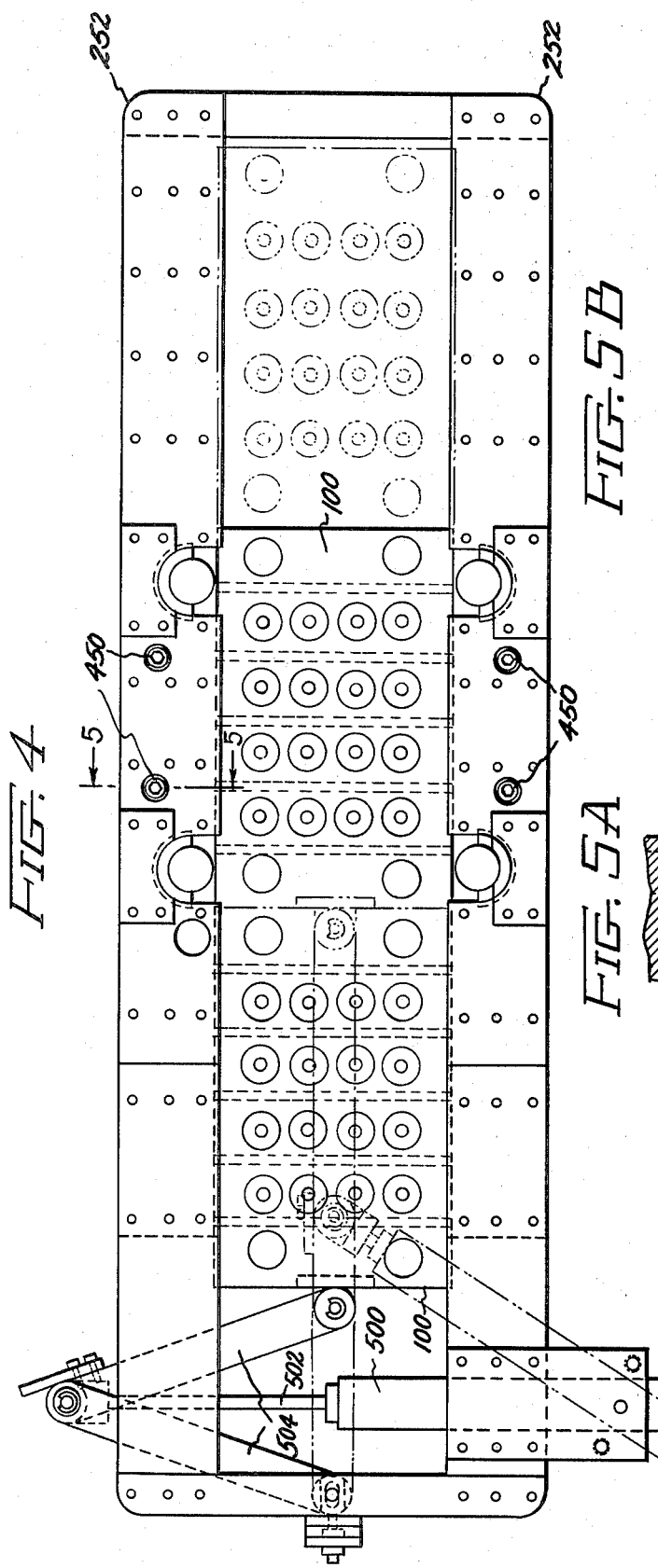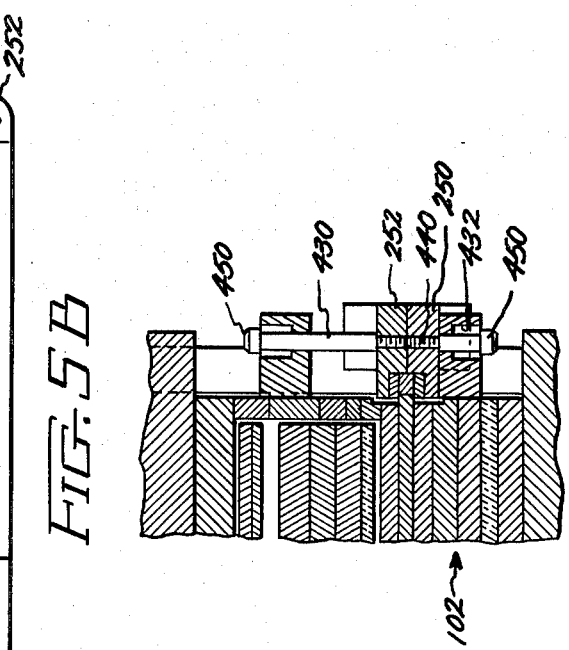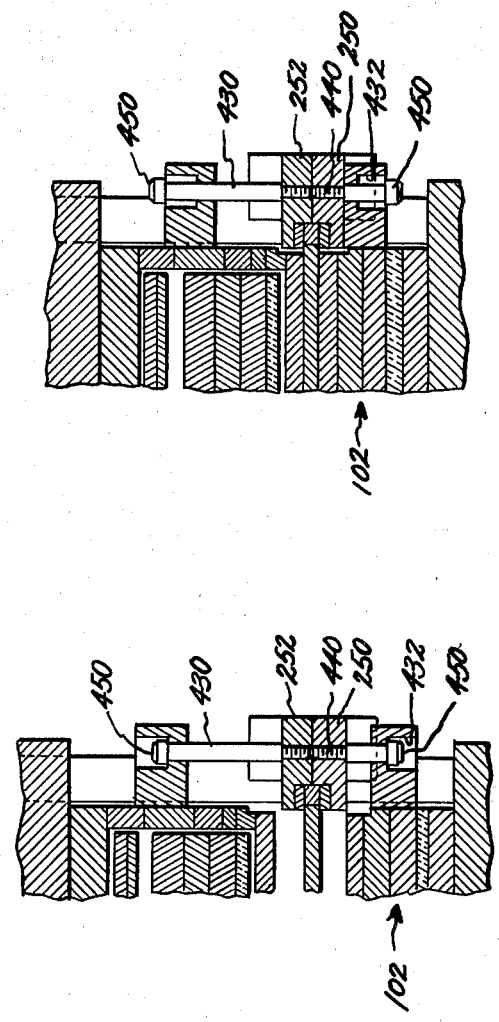

SHUTTLE PLATE IMPROVEMENT FOR A MOLD FOR A LIQUID INJECTION MOLDING APPARATUS

BACKGROUND OF THE INVENTION

The present invention relates to liquid injection molding machines and more particularly, the present invention relates to a mold apparatus for a liquid injection molding machine.

Addition curing silicone compositions are well known. Generally, such addition curing silicone compositions comprise the following basic ingredients: a vinyl containing polysiloxane polymer which is preferably vinyl terminated, a hydride polysiloxane cross linking agent and a platinum catalyst. Such compositions may contain vinyl-containing resins or treated silica fillers and specifically treated fumed silica fillers. There also may be present in such compositions vinyl containing fluids. Such compositions may be made containing ordinary hydrocarbon substituent groups or they can be made with fluorosilicone substituent groups which are disclosed in the patents of Jeram, U.S. Pat. No. 4,041,010 and U.S. Pat. No. 4,029,629 which are hereby incorporated by reference. These compositions are normally packaged in two packages such that the vinyl containing polysiloxane is normally packaged with the hydride cross-linking agent or the hydride cross-linking agent is packaged separately with or without the platinum catalyst, that is the platinum catalyst being either with a hydride or with a vinyl containing polysiloxane. Thus, there is no one package which contains both the platinum catalyst, the vinyl siloxane and the hydride cross-linking agent otherwise the composition will cure. Such a composition containing the three ingredients cures at room temperature. It will also cure at elevated temperatures to a silicone elastomer, that is, temperatures above 100° C.

One development in such compositions has been the use of inhibitors. Thus, a methyl vinyl cyclo polysiloxane has been utilized at small concentrations, that is, in parts per million, as an inhibitor. In such compositions, when the composition is mixed together that is when the two packages are mixed together, there is desired a certain amount of shelf life or pot life without the composition curing. However, by heating the composition at elevated temperatures, the cure takes place in a matter of minutes or even seconds. These various inhibitors have been found to have different degrees of potency. Thus, there is the dialkyl maleates inhibitors that are more powerful than methyl vinyl cyclo polysiloxanes and will give a more extended pot life to the composition after the two packages have been mixed, but which will still cure at elevated temperatures in a matter of minutes or even seconds. By elevated temperatures is meant temperatures above 100° C. The use of such dialkyl maleates in addition curing compositions is disclosed in the patent application of R. Eckberg Ser. No. 40,015 which is hereby incorporated by reference.

Another type of inhibitor that can be utilized is isocyanurate inhibitors which are disclosed in Berger and Hardman, U.S. Pat. No. 3,882,083 which is hereby incorporated by reference. An even more important type of inhibitor which can be utilized is the hydroperoxide inhibitors disclosed in U.S. Pat. No. 4,061,609 which is hereby incorporated by reference. The hydroperoxide inhibitor is so potent that it allows the composition to be formed into a single package and such that it has a shelf life of six months or more. The composition can be applied by being heated at elevated temperatures, that is temperatures above 100° C. to cure rapidly to a silicone elastomer, that is in a matter of minutes or even seconds depending upon how high a temperature it is heated. Such addition curing composition, especially with the inhibitor, have new found uses as compositions to be utilized in liquid molding machines. These compositions have all the advantages of the traditional organic plastics and in addition, have the inherent properties of silicones that is the electric insulative properties of silicones, the weathering properties of silicones and specifically their repellency of moisture.

There are two types of traditional liquid injection molding machines that are presently utilized to form molded organic plastics, one is the reciprocating screw type of liquid molding machine and the other type is the ram or plunger type of liquid molding machine.

With respect to the reciprocating screw type of molding machine, such apparatus works by taking the organic pellets and then by the screw thread of the molding machine forcing the pellets by friction force under pressure to melt and form a liquid plastic which is then pressed forward and fed by the screw of the machine into the mold where upon the mold is cooled to cool the plastic to room temperature and form the molded part.

Since the addition curing silicone compositions are liquids in the uncured state and silicone elastomers in the cured state, it is necessary to modify the traditional reciprocating screw molded machine to handle addition curing silicone compositions. The two basic modifications that were made to the reciprocating screw liquid injection molding machine so it could handle liquid compositions, was to provide a shut-off valve to a reciprocating screw plunger from the liquid silicone composition feed tank and also to provide a seal at the end of the reciprocating screw so that liquid composition will not leak out of the reciprocating screw chamber. It was also necessary to heat the mold to cure the silicone composition to a temperature about 100° C.

A disclosure relating to the modification of a reciprocating screw liquid injection molding machine for the handling of liquid silicone compositions and other silicone molding compositions is to be found in the patent application of A. A. Laghi, Ser. No. 159,262 filed on June 13, 1980 and which is hereby incorporated by reference.

The ram or plunger type of liquid injection molding machine was also modified so that it could handle addition curing silicone compositions. Thus, in such apparatus, there was provided a shut-off valve for shutting off the pressure from the feed tank of the liquid silicone composition from the barrel of the plunger injection molding apparatus. There was also provided a seal on the plunger chamber that operates in the plunger chambers so as to prevent a leak of silicone composition. Other necessary modifications were made to accurately control the shot size of a liquid molding composition that was forced by the plunger into the mold to form a molded part as accurately as possible and consistently as possible so that consistently molded parts could be formed without the leaking of molding composition out of the apparatus and without the malfunction of the mold.

The improvements to the plunger type or ram type of molding machine are to be found in the disclosure of A.

A. Laghi, Ser. No. 183,620 filed on Sept. 2, 1980 which is hereby incorporated by reference.

Another modification of the liquid injection molding machine was to modify the mold in accordance with the disclosure of A. A. Laghi, Ser. No. 272,242, filed on the same day as the present case and which is hereby incorporated by reference. This patent application which is filed on the same day as the present case disclosures a runnerless mold for forming molded parts. By utilizing a pin which fits exactly into the opening of the nozzle opening through which the liquid silicone composition is forced into the mold cavity, the dripping of liquid silicone composition is prevented out of the nozzle opening of the injection molding apparatus, and accordingly, there is no waste of silicone composition. Further, there are not any runners or cured parts of silicone composition hanging on to the molded part which have to be cut off or removed from the molded part so as to result in the final molded part. Other molding machines or molding apparatuses had drippings or threads hanging on to them which had to be removed before the molded part was ready to be sold and put to its final end use. The drop parts or drip formed portions of the part or threads were unsightly and/or affected the functional operation of the parts in the applications they were intended for.

It should be noted that there is disclosed in the co-pending case of A. A. Laghi that the runnerless molds were known for organic plastics. However, organic plastics are heated to allow them to be injected into the mold and then the mold is cooled to room temperature or below so that the part can be formed and removed from the mold as a finished part. On the other hand, silicone compositions are cooled prior to being injected into the mold and then the mold is heated to cure the material into the molded part. Accordingly, the mechanism for making runnerless molds for organic plastics in liquid injection molding machines could not be applied to molds for forming molded parts from silicone compositions. In addition to the runnerless liquid injection molding apparatus disclosed in the co-pending case of A. A. Laghi, Ser. No. 272,242, it was necessary to devise a means for removing the molded part, once it was formed, from the mold cavity as rapidly as possible and as automatically as possible without detracting from the operation of the mold apparatus. Accordingly, it was desirable to devise a shuttle plate means for removing molded parts from mold apparatus, for forming liquid molding compositions which was heated to cure the silicone part, which removal of the molded part could be done as efficiently as possible and as precisely as possible.

Accordingly, it is one object of the present invention to provide for shuttle plate means for a mold apparatus for a liquid injection molding machine which shuttle plate means is very efficient.

It is another object of the present invention to provide automatic and accurate shuttle plate means for removing molded parts from mold apparatuses for liquid injection molding machines.

It is yet an additional object of the present invention to provide a unique and efficient shuttle plate means for removing parts from mold apparatus for a liquid injection molding machine utilizing silicone compositions which are heated to form the part.

It is still an additional object of the present invention to provide for an efficient and accurate shuttle plate for removing molded parts from the mold cavity in a mold apparatus utilizing a liquid injection molding composition.

It is yet an additional object of the present invention to provide a process for forming molded parts in a mold apparatus for a liquid injection molding machine utilizing addition curing silicone compositions where the shuttle plate means is very efficient and accurate.

These and other objects of the present invention are accomplished by means of the apparatus shown in the Figures set forth herein below.

FIG. 2 is a top view of the shuttle plate and of the knock-out plate of the mold apparatus of the present invention.

FIG. 3 is a side cross sectional view of the knock-out plate and shuttle plate of the mold apparatus of the present invention.

FIG. 4 is a top view of the shuttle plate of the present invention showing the shuttle plate track in which it moves.

FIG. 5A and FIG. 5B are end views of the shuttle plate track of the mold apparatus of the present invention along with 5—5 of FIG. 4.

These and other aspects of the present invention are disclosed by the above figures as explained in more detail herein below.

SUMMARY OF THE INVENTION

There is provided by the present invention and in accordance with the above objects and Figures a mold apparatus for a liquid injection molding apparatus comprising, a frame;

support post means mounted on said frame and having a front end and a rear end;

machine frame means on which said support post means are mounted having a front end and a rear end;

a conduit for liquid molding compositions slidably mounted on the forward end of said frame and on the forward end of said mold frame means, a first plate means having passage means therein for the passage of liquid molding composition and fixedly mounted on the forward end of said conduit and adapted to slide within said support post means and within said mold frame means and located adjacent said forward end of said frame;

nozzle means located at the end of said passage means in said first plate means adjacent the rear end of said mold frame means away from said conduit means and adapted to open and close;

shuttle plate means adjacent to said nozzle means which form part of the mold cavity of said shuttle plate means adapted to automatically take a finished molded part from the mold and pass it out of the mold apparatus;

and mold cavity means slidably mounted on said post support means and adapted to move toward and away from said shuttle plate means.

The shuttle plate means while it is passing or has passed the form molded part out of the basic structure of mold cavity plate of the mold frame means the other half of the shuttle plate is being utilized by the mold apparatus to form new molded parts; that is, while the knock-out plate means, as will be explained below, is knocking out the finished mold parts from one portion of the shuttle plate means the other portion of the shuttle plate means is being utilized to form new molded parts. By utilizing the construction that is shown in the Figures and which will be explained below, it is possible to efficiently and accurately form molded parts at a very high production rate and in the most efficient use of the mold apparatus. These functions of the shuttle plate means will be explained in more detail below.

DESCRIPTION OF THE PREFERRED EMBODIMENT

Figure 1:
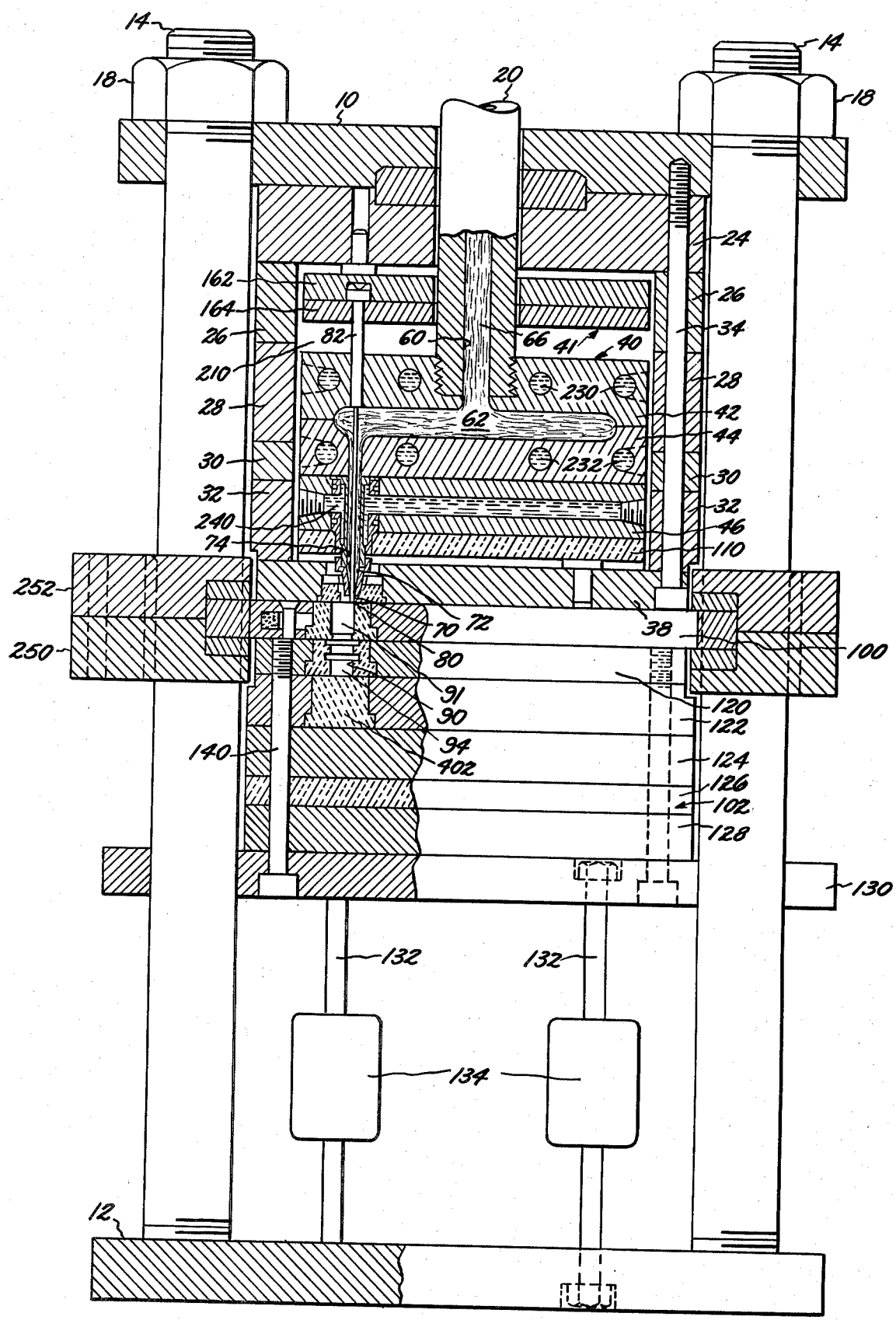
FIG. 1 is a partially fragmentary sectional view partially top view of the mold apparatus of the present case.

Referring to FIG. 1 there is the sides of the frame 10 and 12 which support or in which are located support posts or tie bars 14, there being about four of said support posts on each corner of the rectangular support plates 10 and 12. The location of said tie bars is more clearly seen in FIGS. 2 and 4. Tie bars 14 are held in place by nuts 18. Slidable conduit 20 passes through an opening in frame plate 10 and through an opening in stationary plate 24. Stationary plate 24 is affixed to stationary plate 26 which is affixed to stationary plate 28 which is affixed to stationery plate 30 which is affixed to stationary plate 32 by means of bolts, such as bolt 34. To these stationary plates there is also affixed stationary plate 38 by means of bolt 34.

Plates 24, 26, 28, 30 and 32 remain stationary relative to frame plate 10. In each plate there is openings in which slide first plate means 40 comprising of movable plate 42, movable plate 44, and movable plate 46 which are held together by bolts shown, for instance, in FIGS. 6 and 7 such as bolts 50. First plate means 40 is fixedly attached to conduit 20 by means of conduit 20 being throughly engaged with an opening in plate 42 in first plate means 40, such that when conduit 20 moves or when first plate 40 moves, conduit 20 also moves. Conduit 20 has a passageway 60 or bore 60 therein which opens into passageway 62 in first plate means 40. Liquid molding composition 66 flows through the bore 60 and conduit 20 into passageway 62 and out through nozzle opening means 70 in plate 38.

Nozzle opening means 70 comprises an opening 72 in bore 74 which is connected to passageway 62 in first plate means 40. The forward end 80 of pin member 82 open and closes opening 72 and nozzle opening means 70 so as to allow liquid molding composition to pass into mold cavity 90 to form molded part 94. Mold cavity 90 comprises a mold cavity as will be explained hereinafter which is formed in shuttle plate means 100 and in mold cavity means 102.

It should be noted that first plate means 40 also contains an insulative layer 110 at the end of the first plate means, which is adjacent to plate 46 and which moves integrally with first plate means 40. Mold cavity means 102 comprises plate 120 in which part of the mold cavity is formed, plates 122, 124, insulative layer 126, and plate 128. Further, plate 130 is movably supported on tie bars 14 which are driven on each side by shafts 132 of hydraulic motors 134, which motors are fixedly supported to frame 12 as seen in FIG. 1.

Movable cavity plates 120, 122, 124, insulative layer 126 and plate 128 and plate 130 are held together by bolts 140 such that these plates and insulative layer move integrally.

Figure 6:
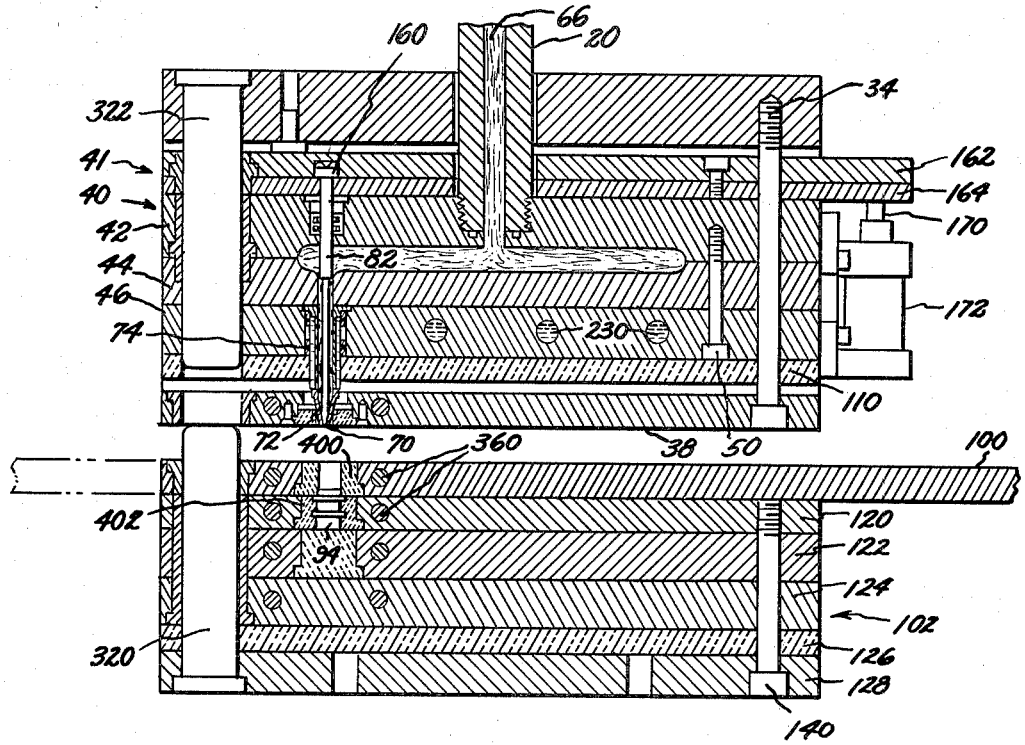
FIG. 6 is a side cross sectional view of the mold apparatus of the present invention showing the movement of the shuttle plate.
Figure 7:
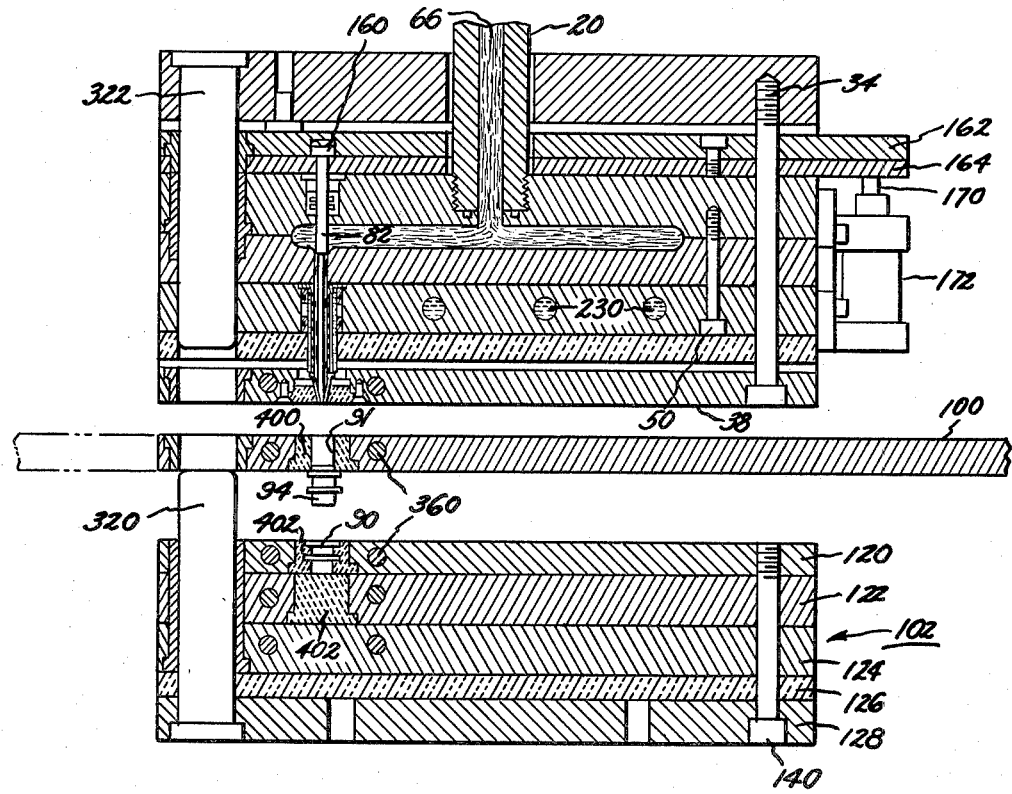
FIG. 7 is a side cross sectional view of the mold apparatus of the present invention showing the movement of the shuttle plate means.

Also looking at FIGS. 6 and 7, pin member 82 has head 160 affixed to plates 162 and 164 which move integrally with pin member 82 through connecting member 170 which is attached to hydraulic motor 172 so as to move the forward part of pin member 82 so as to close and open nozzle opening 72 of nozzle opening means 70 so as to allow the runnerless injection or forcing of liquid composition from bore 74 into the mold cavity of shuttle plate 100 and also into the mold cavity 90 in cavity plates 102 for the formation of the molded part.

The operation of the forward part of 80 pin member 82 in nozzle opening means 70 so as to allow liquid composition to pass into the mold cavity in shuttle plate means 100 when necessary to form a molded part and yet close the nozzle means 70 when the injection of the molding composition is finished, which injection is runnerless without wasting material is the subject of the invention co-pending case of A. A. Laghi, Serial No. 272,242 which was filed on the same date as the present case and which is incorporated in the present case by reference. Accordingly, the operation of such pin member 82 will not be explained in more detail and is the subject of the other co-pending case. The worker skilled in the art is referred to the co-pending case for more details as to the operation of pin member 82 in nozzle opening 70. In FIGS. 6 and 7, it should be noted that conduit 20 also drives first plate means 40 so as to drive means 40 toward and away from nozzle plate 38 and in cavity 210 which is formed between first plate means 40 and second plate means 41 being formed from plates 162 and 164.

Also as noted in FIGS. 6 and 7, there are the appropriate sleeves and bearing surfaces which are shown in more detail in the co-pending case for determining the construction of sleeve 200 in plates 46, insulative layer 110. Further in plate 42 there are coolant passageways 230; and in plate 44 there are coolant passageways 232; and in plate 46 there are coolant passageways 240 for allowing coolant such as water to pass therethrough and prevent liquid molding composition 66 from curing in the nozzles and passageways 62 and 74. This coolant that passes through these plates to prevent liquid composition 66 from curing is that the composition such as the silicone addition curing composition needs heat to cure it. If the present mold is utilized for an organic molding composition, which it can be, then, of course, there will be passed through these coolant passageways 230, 232 and 240 a heating media to heat the composition to temperatures above room temperature so that it remains a fluid. As will be noted hereinafter, there will be passed a coolant fluid in the mold cavity plate 120 so as to cool the molded part when the mold is used for molding of organic plastics. In the present case when the present mold apparatus is utilized to mold a silicone addition curing composition to form a molded part, then in mold cavity plates 120 there is passed a heating fluid or a heating media so as to heat the mold to temperatures above 100° C. and to heat molded part 94 above 100° C. so as to rapidly cure the silicone addition curing composition to a molded part.

In the operation of the apparatus, there has been disclosed so far, first plate means 40 is moved by means of conduit 20 so that sleeve 200 and nozzle opening 72 comes into contact with nozzle opening means 70 in nozzle plate 38. Then hydraulic motor 172 through member 170 moves second plate means 41 and accordingly, forward member 80 of pin member 82 opens nozzle opening 72 to allow liquid molding composition to pass into mold cavity 90, and also the mold cavity in shuttle plate means 100. When according to logic control, sufficient liquid molding composition 66 has passed into mold cavities 91 and 90 and when sufficient time has elapsed, then hydraulic motor 172 through member 170 moves second plates means 41 so that it moves toward nozzle plate 38 moving forward end 80 of pin member 82 to close nozzle opening 72 of nozzle opening means 70. After forward member 80 of pin member 82 closes nozzle opening 72 in nozzle opening means 70, conduit 20 causes the first plate means 40 to move away from nozzle plate 38, such that the forward end 80 of pin member 82 along with the closed nozzle opening means 70 and sleeve 200 and conduit 20 moves away from plate 38. It is then possible for the shuttle plate means 100 of the present case to operate in accordance with the present invention, as will be discussed herein below.

Shuttle plate means 100 moves in shuttle plate members 250 and 252 which are supported on tie bars 14 as shown in FIG. 1. As seen more clearly in FIGS. 2 and 3, the nozzle plate 38 has two extending plates on each side, plates 260 and 262, which have alignment pins in them 270, 272, 280 and 282. Alignment pins 280 and 282 pass through opening 290 and in the second shuttle plate 302 as the case may be to align the parts and alignment pins 283 pass through the mold cavities to knock-out molded parts 304 when mold cavity plate 102 move towards nozzle plate 38 by means of motors 134, through shafts 132. This operation will be explained hereinafter.

Further, guide pins 320 fit into openings in shuttle plate means 100 and mold cavity plates 120, 122, 124, 126 and 128 as seen in FIGS. 6 and 7 which align these plates. There are also alignment pins 322 which fit into openings along with the appropriate sleeves in first plate means 40 and second plate means 41 as well as in frame plate 10 and 12, as well as in stationary plate 24 which align first plate means 40 and 41 with stationary plate 24 as seen in FIGS. 6 and 7.

As also seen in FIGS. 6 and 7, there are heating ducts 360 in shuttle plate means 100, and heating ducts 362 in cavity plates 102 which allow a heating media to heat cavity plates 102 in shuttle plate means 100 so as to heat the molded part 94 in mold cavities 91 and 90 so as to form the molded part. It should be noted as can be seen from FIG. 1 and the other FIGS. 6 and 7, in mold cavity plate 120 and shuttle plate means 100, there are cut-outs which are filled by mold filler material 402 to form the configuration of the molded part 94. By this means, if it is desired to form a different molded part, then part 94 as seen in FIG. 1 and in other FIGS. 6 and 7, it is only necessary to change the mold filler material 400, 402 mold cut-outs 400 so as to form the configuration of a different form part. It is not necessary to change the entire mold cavity plates and shuttle plate means to form the different molded part. Such mold filler material can be selected from the following materials: hard steel, titanium and other metals and plastics.

Now, proceeding to the operation of the shuttle plate means 100. The shuttle plate comprises two plates 300 and 302 as seen in FIG. 3. When forward member 80 of pin member 82 has closed the nozzle opening 72 in nozzle opening means 70 by means of logic control motors 134 through hydraulic shafts 132 move mold cavity plates 102 away from nozzle opening plate 38. By the frictional force caused by the presence of molded part 94 being partially in mold cavity 90 the part is carried within shuttle plate 100. However, in mold cavity plates 102 there runs therethrough four rods 430 with stop ends 450 which pass through bores 432 in mold cavity plates 102 and which are solidly connected to shuttle tank members 250 and 252. Rods 430 have stop members 450 at their ends which pass or ride normally in bores in openings in plates 120 and 38. To go over the portion of the apparatus when pin member 80 has properly closed nozzle opening 72 of nozzle opening means 70 in nozzle plate 38 according to logic, control, logic control activates motor 134 through shaft 132 and moves mold cavity plates 102 away from nozzle plate member 38. Mold cavity means 102 moves integrally, since it it connected by pin 140, away from shuttle plate means 100. Since there is required more friction to tear the molded part 94 away from mold cavity 91 than is required to tear away the molded part 94 from mold cavity 90, the molded part 94 stays in mold cavity 91 as seen in FIG. 3. There pass in mold cavity plates 102 rods 430 which pass through bores 432 in mold cavity plates 102. Rods 430 are connected through threaded bores 440 in shuttle tracks 250 and 252. Rods 430 also have stop members 450 thereon. When according to presescribed design, mold cavity plate means 102 has passed sufficiently away or below shuttle plate 100 then stop members 450 engage plate 28 and the shuttle plate 100 which is held in the tracks 250 and 252, integrally is moved away from plate 120 as shown in FIGS. 3 and 7. When this is accomplished, then shuttle plate 100 is ready to move sideways.

By logic control, hydraulic cylinder 500, through shaft 502, and appropriate linkages 504 moves shuttle plate 100 sideways to the extreme right of mold cavity means 102 as seen in FIG. 3. By logic control mold cavity plates means 102 are moved through motors 134 and shafts 132 back towards shuttle plate 100; and towards nozzle opening plate 38 so that pins 320 are aligned in the openings of shuttle plate 300 and in the openings in nozzle plate 38.

The mold cavity plate means 102, the shuttle plate 100 and the nozzle opening plate 38 are then next to each other as seen in FIG. 1. When this happens, then as can be seen in FIG. 3, the knock-out pins 283 automatically knock out the molded parts 304 into a waiting bin. Alignment pin 282 fits into opening 290 and half of the shuttle plate 100 has come together with mold cavity plates 102 and nozzle opening plate 38 to form a new molded part cavity such as 90 and 91 as seen in FIG. 1. Then, it is ready for pin member 82 through second plates means 41 to retract or move in the direction away from nozzle plate 38 such that nozzle opening 72 in nozzle opening means 70 opens to allow liquid molding composition to pass into mold cavity 90 and 91 to form new molded parts. When the part is formed and the forward end 80 of pin member 82 closes nozzle opening 72, then the previous cycle is repeated and through motors 134 and shafts 132, mold cavity plate means 102 is moved again from nozzle opening plate 38 so as to move nozzle plate mold cavity means 102 away from shuttle plate 100 and then pull rods 430, and shuttle plate 100 away once more from nozzle opening plate 38 so that the shuttle plate 100 can be moved sideways to the left as seen in FIG. 3. Where then upon the mold cavity plate means 102 coming together with the half of the shuttle plate 100 which is empty of mold parts and nozzle opening plate 38.

There the new molded parts in plate 100 will be knocked-out of the cavity 91 in half of the plate 100 through knock-out pins 281 in knock-out plate 260.

Accordingly, this cycle will be repeated to form new molded parts and to knock-out molded parts by means of the shuttle plate means 100 of the instant invention as has been described above as automatic. By means of this mold apparatus, molded parts can be formed in runnerless non-wasting and efficient manner. By the shuttle plate means of the instant invention molded parts can be removed from the mold automatically and efficiently and knocked-out of the mold in a very rapid and automatic fashion without harming the molded parts and without disrupting the operation of the mold. It should be noted, the shuttle plate means use should not be limited to the particular mold of the instant case and can be utilized with other types of molds as is appropriate.

It also should be noted that this particular shuttle plate means is not limited to molds in which only silicone addition curing compositions are molded to form molded parts. The present invention can be utilized with any type of molding composition and in particular, with an organic type of mold composition for forming organic plastic parts. Thus, the instant mold and instant shuttle plate means may be utilized to form molded parts from organic plastics where the mold is cooled to form the molded plastic part. As has been noted, it is preferred that the mold be heated to form the molded part, and it is preferred that the instant mold and shuttle plate means be utilized with silicone molding compositions and more particularly, with silicone addition curing compositions; since the mold apparatus and the shuttle plate means has its greatest advantage with such molding compositions. It should be noted also as seen in FIGS. 6 and 7 and elsewhere that pins 322 and pins 320 pass through openings in the foregoing plates which have the appropriate bearing sleves in them; such as sleeves 550 and 552 in the various plate in which they move through. However, these are well known methods of construction and will not be going into details as they do not effect any parts of the present invention. In addition, it should be pointed out that the shuttle plate means 100 moves in a shuttle track 300 which construction is shown with particularity in FIG. 1 and in more detail in FIGS. 4 and 5. This shuttle track means has been developed to accomplish the scope of the instant invention. The particular track as shown here is preferred. However, other shuttle track means can be utilized as is desired.

The important part of the shuttle track is having the two knock-out plates 260 and 262 adjacent to nozzle opening plate 38 as shown in FIG. 3 and also the particular movement of shuttle plate 100 away from nozzle opening plate 38 and separating from mold cavity means 102 as been described above and the movement automatically of shuttle plate 100 sideways to form mold parts and at the same time automatically knock-out the already formed molded parts that is in the other half of the plate as seen in FIG. 3. In the next cycle of the operation of the shuttle plate means 100, one half of plate 100 is forming molded parts and the other half of plate 100 is having already formed molded parts knock-out of it by knock-out pins 283.

It should also be noted that even though FIG. 1 shows one mold cavity, FIG. 1 is not a true cross sectional view and in the actual mold there are sixteen mold cavities as seen in FIGS. 2, 3 and 4. Each mold cavity having the configuration and the functions as shown in FIG. 1 and elsewhere. Each mold cavity is equipped with both a nozzle means 70, along with the appropriate pin member 82. Each pin member has the necessary mold cavity 90 and 91 in shuttle plate means 100 and mold cavity plate means 102. Since there are sixteen mold cavities there are sixteen molded parts being formed at the time and sixteen formed parts being knocked out of the shuttle plate at a single time. Of course, the amount of mold cavities and appropriate pin members may be smaller or greater depending on the design of the mold. It has been found that for good production of molded parts there can be obtained sixteen mold parts formed at a time. However, this is one design and it should be understood the mold may be designed for the formation of more molded parts at a time or less as it is desired. By utilizing a bigger mold, it can be appreciated that more molded parts can be formed at a time that is the mold can be constructed so that more molded parts are formed at a time and by utilizing a smaller piece of equipment, the mold can be designed to form a smaller number of molded parts at a time. It should also be noted that sleeve 200 has the appropriate number of bearing surfaces in the various plates. In first plate means 40 in forming the conduit for the passage of the liquid molding composition which conduit means and bearing means are well known such as 600 and are well within the skill of the art and as such will not be described in detail herein.

Finally, it is necessary to go into the type of silicone composition that be utilized in the instant mold apparatus. It should be noted that the present mold is not limited solely to silicone compositions and there can be utilized in the mold organic plastic compositions. It is preferably advantageous to utilize therein silicone compositions and more specifically, silicone addition curing compositions. An example of a silicone addition curing composition which can be utilized is a silicone addition curing composition comprising 100 parts of a vinyl terminated diorganopolysiloxane polymer having a viscosity varying from 100 to 500,000 centipoise at 25° C. and more preferably having a viscosity varying from 100 to 100,000 centipoise at 25° C. where the organic groups are monovalent hydrocarbon radicals. To 100 parts of the above vinyl containing polymer, there is preferably added from 1 to 50 parts by weight of a hydride polysiloxane such as linear hydride organopolysiloxane having a viscosity varying from 10 to 1,000 centipoise at 25° C. or a hydride resin such as defined in, U.S. Pat. No. 4,041,010 which is hereby incorporated by reference. It should be noted that even though the above patent is specific to fluorosilicone compositions, the same technology can be applied to make non-fluorinated silicone addition curing compositions which are useful in liquid injection molding. That is, the hydride resins of Jeram which are not fluoronated and the hydride polysiloxane can be utilized in addition curing compositions which are useful in liquid injection molding. Further, fluorinated versions are also useful in such liquid injection molding apparatus such as that of the instant invention. Finally the third necessary ingredient in the composition is from 1 to 200 parts per million of a platinum catalyst. There can be utilized any platinum catalyst such as solid platinum deposited in gamma alumina on carbon black. There is more preferably utilized a solubilized platinum complex. Any type of solubilized platinum complex can be utilized, the preferred one is lamoreaux catalyst which is disclosed in U.S. Pat. No. 3,313,773. There may be utilized other vinyl compositions in such polymers such as vinyl resins, such as disclosed in the foreing patents and specially treated silica fillers.

Examples of agents which can be utilized to treat the silica fillers for instance, are silazanes and fluorosilazanes. Cyclopolysiloxanes are other silicone treated agent. There may also be incorporated into the composition for strength purposes instead of the silica fillers (which are incorporated per 100 parts of the vinyl base polymer of anywhere from 5 to 50 parts of silica filler) at a concentration of 5 to 50 parts by weight from 100 parts of the base vinyl containing polymer of a vinyl resin or a vinyl containing polysiloxane polymer which contains triorganosiloxy terminated units or are end of the polymer chain and vinyl diorganosiloxy units on the other end of the polymer chan. Examples of such polymers are for instance to be found in the foregoing general patents and also in U.S. Pat. No. 3,884,866 which is hereby incorporated by reference.

The next necessary ingredient in such compositions is an inhibitor as disclosed in the foreging Hardman, Eckberg patent applications and the most effective inhibitor that is the hydroproxide inhibitor of Bobear is U.S. Pat. No. 4,061,609 which is hereby incorporated by reference. To date, the most desirable inhibitors have been compositions utilizing the dialkyl materials of the Eckberg Patent Application or the hydroperoxide inhibitor of the Bobear Patent. The amount of inhibitor that is in the composition will vary from composition to composition. There is most preferably utilized an effective amount which will provide sufficient inhibitor activity to the composition to give a sufficient shelf life in either a one-component state or two component state after being mixed and will not cure at room temperature but will cure in the mold at temperatures above 100° C. in a matter of seconds. However as stated previously, the instant invention is not limited soley to silicone molding curing compositions but can be utilized with other molding compositions silicone and non-silicone as is found suitable.

I claim:

1. A mold apparatus for a liquid injection molding apparatus for forming parts from a liquid molding composition comprising:
    a frame having a forward end and a rear end;
    mold plate means mounted on said frame and having a front end and a rear end;
    support means mounted on said mold plate means and having a front end and support post at the rear end;
    a conduit for liquid molding composition slidably mounted on the forward end of said frame and on the forward end of said mold frame means;
    a first plate means having passage means therein for the passage of liquid molding composition and fixedly mounted on the end of said conduit and adapted to slide within said support post means and within mold frame means and located adjacent said forward end of said frame;
    nozzle means located at the end of said passage means in said first plate means adjacent the rear end of said mold frame means away from said conduit means, said nozzle means including closing pin means slidably mounted in said mold frame means and adapted to open and close a nozzle opening means in said nozzle means;
    shuttle plate means adjacent to said nozzle means which forms part of the mold cavity, said shuttle plate means adapted to automatically take a finished molded part from the mold and pass it out of the mold apparatus by providing a knock-out plate means located on both sides of said nozzle means, in the same plane as said nozzle means and substantially external to the support post means, said knock-out plate means being integral with the nozzle plate and comprising first and second knock-out plates containing knock-out pins which are adapted to fit in the mold cavities in said moving shuttle plate means so as to knock out the molded parts in the mold cavities in said moving shuttle plate means; and
    mold cavity means slidably mounted on the rear end of said support part means and adapted to move toward and away from said shuttle plate means.

2. The mold apparatus of claim 1 wherein said knock-out plates do not move sidways with the moving shuttle plate means.

3. The mold apparatus of claim 2 wherein the moving shuttle plate means comprises two shuttle plates, a first and second shuttle plate formed integrally which have partial mold cavities therein which form along with the mold cavity means the total mold wherein a part of said shuttle plates when it is directly adjacent to the mold cavity means and the cavity plates in the mold cavity means or brought next to the shuttle plates therein forms an integral mold cavity ready for the formation of molded parts and when the cavity plates are moved away from said shuttle plate said shuttle plate can move to the side so that the shuttle plate can move next to knock-out plate to knock-out the molded parts from the partial mold cavities in the first and second shuttle plates.

4. The mold apparatus of claim 3 wherein a first drive means drives said first shuttle plates sideways to that while said first shuttle plate is having molded parts knocked-out of it by the knock-out pins on said first knock-out plate said second shuttle plate is acting as a mold with the cavity plates so that liquid molding compositon is admitted to form the molded parts in said second shuttle plate, and when the molded parts are formed in said second shuttle plate said first drive means drives said second shuttle plate sideways and adjacent said second knock-out plate so that the knock-out pins knock-out the formed molded parts from said second shuttle plate which said first shuttle plate moves sideways integrally with said second shuttle plate so that along with said cavity plates said first shuttle plate forms integral cavities in which there is forced liquid compositon through said nozzle opening means into said mold cavities to form molded parts and wherein the above cycle of the first and second shuttle plates is continuously repeated to form and knock-out molded parts.

5. The mold apparatus of claim 4 further comprising a second drives means which integrally drive said mold cavity plates toward and away from said nozzle opening means.

6. The mold apparatus of claim 5 wherein there are affixed pull pin means on said mold cavity plates such that when mold cavity plates move away from said nozzle opening means initially mold cavity plates separate from the shuttle plate since the mold cavity plates move integrally and are free of the movement of said first and second shuttle plates; then after a designated movement of the mold cavity plates said pull pin means catch and pull said first and second shuttle plates away from said nozzle opening means for a designated distance so that the first and second shuttle plates can move sideways as is necessary.

7. The mold apparatus of claim 6 wherein said nozzle opening means is formed in a plate which is formed integrally with said first and second knock-out plates and wherein said second drives means drive mold cavity plates toward said nozzle opening plate after said first and second shuttle plates have moved sideways as is appropriate so as to drive one of the shuttle plates next to the nozzle opening plate and so as to drive the mold cavity plates next to the same shuttle plate to form an integral mold cavity for the admission of liquid molding composition and so as to align the appropriate knock-out plates to knock-out the molded parts from the other shuttle plate.

8. The mold apparatus of claim 7 wherein the pull pin means is a pull rod with a stop means at one end and which rides in a bore in said mold cavity plates and in a bore in the mold plates above said mold cavity plates but in which the stop means catches and pulls the first and second shuttle plates along away from the nozzle opening plate when said cavity plate means drives away from nozzle opening plates said pull rod moving integral therewith and wherein said stop means and pull rod slides in a bore in the mold plates when said mold cavity plates are moved toward said nozzle opening plates without causing a pulling movement on any of the plates.

9. The mold apparatus of claim 8 wherein the knock-out plates have alignment pins and the first and second shuttle plates have alignment openings for aligning these plates when they come next to each other.

10. The mold apparatus of claim 9 wherein the mold cavity plates have openings and alignment pins for aligning the cavity plates and also for aligning the cavity plates with the appropriate shuttle plates.

11. The mold apparatus of claim 10 wherein there is further present a shuttle track means attached to said apparatus for said first and second shuttle plate means to be guided and supported in their movements.

12. The mold apparatus of claim 11 wherein said closing pin means is mounted on second plate means having fixedly attached thereto a pin member at the rear end of said pin member said pin member passing through a bore in said first plate means through part of said passage means in said first plate means such that the forward end of said pin member engages and disengages from said nozzle opening means.

13. The mold apparatus of claim 12 further including third drive means mounted on the side of the mold frame means which moves said second plate means as required to open and close said nozzle opening means and also attached to said first plate means and adapted to move said first plate means toward and away from said cavity mold means.

14. The mold apparatus of claim 13 wherein the forward end of said pin member fits in close proximity to the nozzle opening in nozzle opening means such that the liquid molding composition cannot pass out of said nozzle opening.

15. The mold apparatus of claim 14 wherein said first and second plate means have bores therein through which pass post guides to align the various plates in and first and second plate means.

16. The mold apparatus of claim 15 wherein said first plate means has coolant passageways for passing coolant therethrough for cooling said liquid molding composition prior to its being injected in said mold cavity means.

17. The mold apparatus of claim 16 wherein mold cavity means has heating liquid passageway to cure the composition in the mold cavity.

18. The mold apparatus of claims 4, 5 or 13 wherein said first, second or third drive means is a hydraulic drive means.

* * * * *